United States Patent
Tanaka et al.

(10) Patent No.: US 7,099,758 B2
(45) Date of Patent: Aug. 29, 2006

(54) PARKING ASSIST APPARATUS

(75) Inventors: Yuu Tanaka, Aichi-ken (JP); Yoshifumi Iwata, Anjo (JP); Hideyuki Iwakiri, Tajimi (JP); Hisashi Satonaka, Susono (JP); Yuichi Kubota, Okazaki (JP); Tomohiko Endo, Toyota (JP); Akira Matsui, Toyota (JP); Toru Sugiyama, Toyota (JP); Seiji Kawakami, Susono (JP); Katsuhiko Iwazaki, Suntou-gun (JP); Hiroaki Kataoka, Susono (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 217 days.

(21) Appl. No.: 10/809,548

(22) Filed: Mar. 26, 2004

(65) Prior Publication Data

US 2004/0254720 A1    Dec. 16, 2004

(30) Foreign Application Priority Data

Mar. 27, 2003    (JP)    ............................. 2003-088650

(51) Int. Cl.
*G06F 7/00* (2006.01)
*B60S 9/00* (2006.01)
(52) U.S. Cl. .................... 701/36; 180/199; 280/761
(58) Field of Classification Search .................. 701/36, 701/41, 42, 23, 25, 28; 348/148; 180/167, 180/199; 280/761; 340/932.2
See application file for complete search history.

(56) References Cited

U.S. PATENT DOCUMENTS

| 6,275,754 | B1 | 8/2001 | Shimizu et al. |
| 6,929,082 | B1 * | 8/2005 | Kataoka et al. ............. 180/204 |

FOREIGN PATENT DOCUMENTS

| EP | 1170171 A2 | 1/2002 |
| EP | 1327571 A1 | 7/2003 |
| EP | 1332948 A1 | 8/2003 |
| JP | 10-264839 | 10/1998 |

* cited by examiner

Primary Examiner—Y. Beaulieu
(74) Attorney, Agent, or Firm—Buchanan Ingersoll & Rooney PC

(57) ABSTRACT

A parking assist apparatus includes an initial traveling locus calculator for calculating an initial traveling locus, a new traveling locus calculating a new traveling locus when a deviation amount of the present vehicle position from a current traveling locus is equal to or greater than a first predetermined value, and a parking assist for performing a parking assist to guide the vehicle along the traveling locus. The parking assist apparatus further includes an initial traveling locus deviation calculator for calculating the deviation amount of the present vehicle position from the initial traveling locus generated by the calculation of the initial traveling locus calculator. The parking assist stops performing the parking assist when the deviation amount calculated by the initial traveling locus deviation calculator is equal to or greater than a second predetermined value which is smaller than the fist predetermined value.

8 Claims, 6 Drawing Sheets

10 Parking assist apparatus

PARKING ASSIST APPARATUS

This application is based on and claims priority under 35 U.S.C. § 119 with respect to Japanese Application No. 2003-088650 filed on Mar. 27, 2003, the entire contents of which are incorporated herein by reference.

FIELD OF THE INVENTION

This invention generally relates to a parking assist apparatus for calculating a traveling locus of a vehicle to a target parking position and guiding the vehicle along the calculated traveling locus. More particularly, this invention pertains to a parking assist apparatus for calculating a new traveling locus of the vehicle to the target parking position in case that a deviation of a present vehicle position from the calculated traveling locus is large.

BACKGROUND OF THE INVENTION

A known parking assist apparatus calculates a traveling locus of a vehicle to a target parking position and guides the vehicle along the calculated traveling locus. Such a parking assist apparatus is disclosed in Japanese Patent Laid-Open Publication No. H10-264839. According to the disclosed parking assist apparatus, a deviation amount of a present vehicle position from the calculated traveling locus is calculated while the vehicle is guided to the target parking position. When the deviation amount reaches or exceeds a predetermined value, the traveling locus to the target parking position is recalculated to thereby specify a new traveling locus required for a movement of the vehicle. Therefore, the vehicle may be guided along a newly calculated traveling locus each time the vehicle is deviated from the traveling locus to the target parking position according to the disclosed parking assist apparatus.

According to the disclosed parking apparatus, the vehicle is appropriately guided to the target parking position by calculating the new traveling locus in case that the vehicle is slightly deviated from the initially calculated traveling locus due to a small obstacle such as an inclination of a road and a stone, a disturbance such as a change of a wheel radius caused by a change of a load mounted on the vehicle, and the like. However, if an error of a system itself of the parking assist apparatus occurs, the vehicle cannot be ultimately guided to the target parking position even though the new traveling locus is calculated. As a result, the vehicle cannot be parked in the target parking position.

When the new traveling locus is repeatedly calculated each time the deviation of the present vehicle position from the initially calculated traveling locus is detected to thereby guide the vehicle to the target parking position, the vehicle may move in an unexpected manner due to the continuation of the parking assist control.

Thus, a need exists for a parking assist apparatus that can stop a parking assist control immediately when a system error occurs.

SUMMARY OF THE INVENTION

According to an aspect of the present invention, a parking assist apparatus includes an initial traveling locus calculating means for calculating an initial traveling locus from an initial position of a vehicle to a target parking position in which the vehicle is desired to be parked, a new traveling locus calculating means for calculating a new traveling locus from a present vehicle position to the target parking position when a deviation amount of the present vehicle position from the initial traveling locus is equal to or greater than a first predetermined value, and a parking assist means for performing a parking assist to guide the vehicle along the traveling locus generated by one of a calculation of the initial traveling locus calculating means and a calculation of the new traveling locus calculating means. The parking assist apparatus further includes an initial traveling locus deviation calculating means for calculating the deviation amount of the present vehicle position from the initial traveling locus generated by the calculation of the initial traveling locus calculating means. The parking assist means stops performing the parking assist when the deviation amount calculated by the initial traveling locus deviation calculating means is equal to or greater than a second predetermined value which is greater than the fist predetermined value.

According to another aspect of the present invention, a parking assist apparatus includes an initial traveling locus calculating means for calculating an initial traveling locus from an initial position of a vehicle to a target parking position in which the vehicle is desired to be parked, a new traveling locus calculating means for calculating a new traveling locus from a present vehicle position to the target parking position when a deviation amount of the present vehicle position from a current traveling locus is equal to or greater than a first predetermined value, and a parking assist means for performing a parking assist to guide the vehicle along the traveling locus generated by a calculation of the initial traveling locus calculating means or a calculation of the new traveling locus calculating means. The parking assist apparatus further includes a number counting means for counting a number of the new traveling locus to be generated by the calculation of the new traveling locus calculating means after the initial traveling locus is generated by the calculation of the initial traveling locus calculating means. The parking assist means stops performing the parking assist when the number of the new traveling locus to be generated, which is counted by the number counting means, is equal to or greater than a predetermined number.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements.

DETAILED DESCRIPTION OF THE INVENTION

Figure 1:
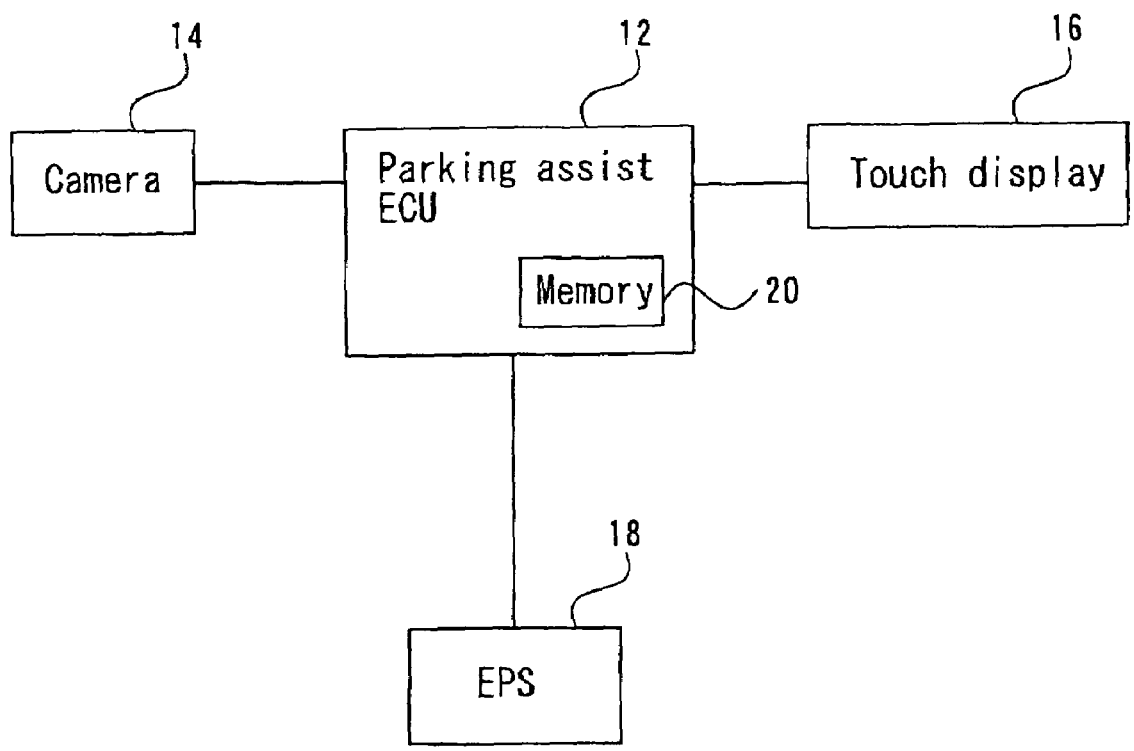
FIG. 1 is a system block diagram of a parking assist apparatus mounted on a vehicle according to an embodiment of the present invention.

An embodiment of the present invention is explained referring to attached drawings. FIG. 1 is a system block diagram of a parking assist apparatus 10 mounted on a vehicle according to the embodiment of the present invention. The parking assist apparatus 10 controls to steer the vehicle automatically without an operation of a vehicle driver at a time of garage parking and parallel parking so that the vehicle is guided along a traveling locus to a target parking position being set by the vehicle driver (herein after called "parking assist control").

As shown in FIG. 1, the parking assist apparatus 10 includes an electronic control unit for parking assist 12 (hereinafter called "parking assist ECU") and is controlled thereby. A rearward monitoring camera 14 (hereinafter called "camera") is connected to the parking assist ECU 12. The camera 14 is disposed at a center of a vehicle rear portion and takes images rearward of the vehicle within a predetermined angle range. The image information of the camera 14 is supplied to the parking assist ECU 12.

A touch display 16 is also connected to the parking assist ECU 12. The touch display 16 is disposed in a certain position so that the vehicle driver can view and operate (for example, at a center of an instrument panel). When a shift lever is in a reverse position, the parking assist ECU 12 brings the touch display 16 to display the image taken by the camera 14, for example. Then, a rearward image of the vehicle is displayed on a screen of the touch display 16 in accordance with an instruction of the parking assist ECU 12. In addition, the touch display 16 displays a reference line, frame and the like for the parking assist control additionally on the image taken by the camera 14 in accordance with an instruction of the parking assist ECU 12.

A touch operation portion of a pressure-sensitive type, a warm-sensitive type and the like that can be operated by the driver is provided on the touch display 16. The touch operation portion includes a plurality of switches having a hierarchical structure and displayed on the screen in accordance with an instruction of the parking assist ECU 12. The parking assist ECU 12 detects a touch operation conducted by the driver on the touch operation portion and performs a procedure in response to that operation conducted on the touch operation portion. The touch operation portion includes a switch for starting a garage parking mode, a switch for starting a parallel parking mode, an arrow button switch for setting a target parking position in which the driver parks the vehicle, and the like.

An electrical power steering system 18 (hereinafter called EPS) is further connected to the parking assist ECU 12. The EPS 18 includes a torque sensor for detecting a steering torque applied to a steering shaft by a steering operation of the vehicle driver, a steering angle sensor for detecting a steering angle of the steering shaft, and an electric motor for applying a torque to the steering shaft. The EPS 18 generates a torque in the electric motor so that the steering torque produced upon the steering operation by the driver can be assisted. At the same time, the EPS 18 generates the torque in the electric motor for steering the vehicle without the steering operation of the driver at the garage parking and the parallel parking along with the parking assist control (to be mentioned later).

The EPS 18 supplies the detected steering information of the steering shaft to the parking assist ECU 12. The parking assist ECU 12 supplies a target steering angle required for the steering shaft to the EPS 18 during the implementation of the parking assist control (to be mentioned later). The EPS 18 generates the torque required for the parking assist control in the electric motor after receiving the information of the target steering angle from the parking assist ECU 12.

The parking assist ECU includes a memory 20. The memory 20 stores the information of the target parking position set by the driver and the traveling locus to the target parking position produced by calculation. The information stored in the memory 20 is generally deleted when the parking assist control is completed, i.e., a shift lever is shifted to a parking position, neutral position and the like from the reverse position, or the vehicle approaches to the target parking position.

An operation of the parking assist apparatus 10 of the present embodiment is explained as follows.

Figure 2A:
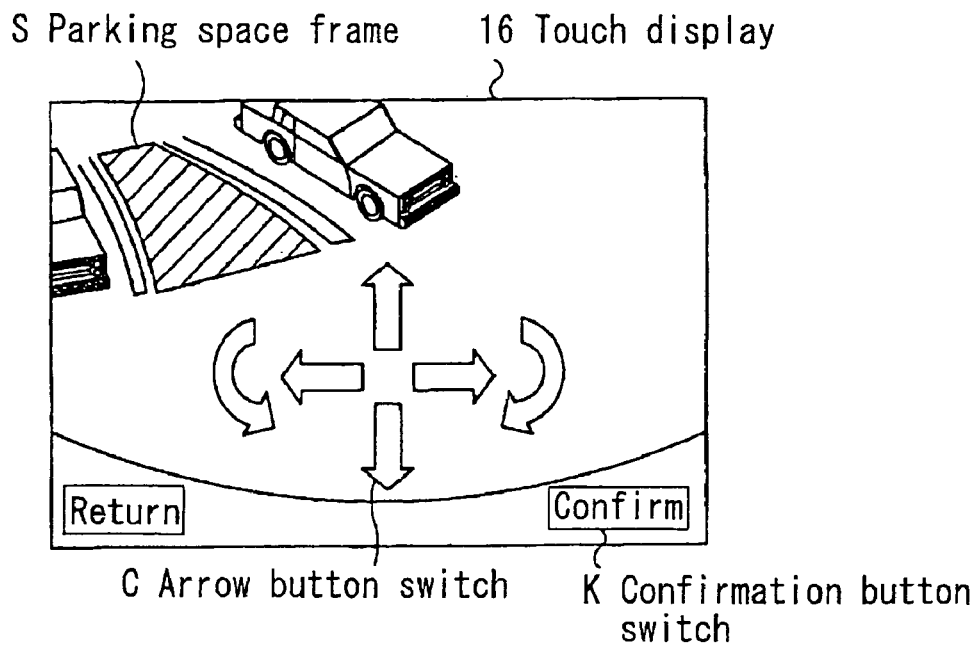
FIG. 2A is a view of an image displayed on a screen when a target parking position for a garage parking is set according to the embodiment of the present invention.
Figure 2B:
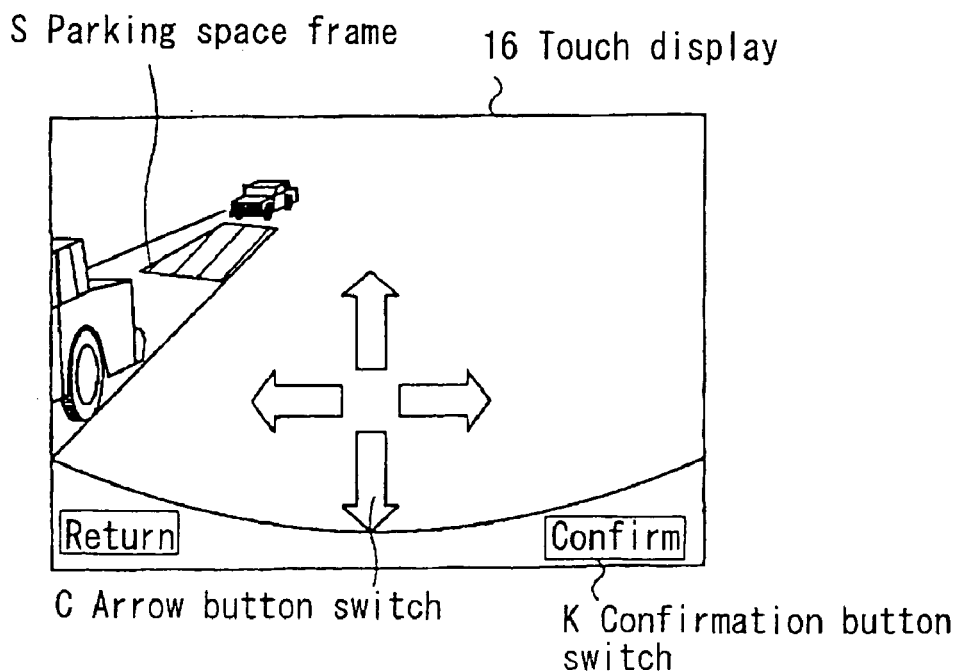
FIG. 2B is a view of the image displayed on the screen when the target parking position for a parallel parking is set according to the embodiment of the present invention.

FIG. 2A is a view showing an image displayed on the screen of the touch display 16 when the target parking position for the garage parking is set in the parking assist apparatus 10. FIG. 2B is a view showing an image displayed on the screen of the touch display 16 when the target parking position for the parallel parking is set in the parking assist apparatus 10 of the present embodiment.

When the shift lever of the vehicle is shifted to the reverse position, the rearward image of the vehicle taken by the camera 14 is displayed on the screen of the touch display 16. At this time, in addition, the switches for starting the garage parking mode and the parallel parking mode are both displayed on the screen.

When the garage parking mode switch is operated by a touch operation in the aforementioned state, a frame S (hereinafter called "parking space frame") into which the vehicle should be parked on the road by the garage parking, and an arrow button switch C for moving and rotating the parking space frame S are both displayed on the screen of the touch display 16 as shown in FIG. 2A while the rearward image of the vehicle taken by the camera 14 is displayed on the screen.

In this case, the arrow button switch C includes an upward switch for moving the parking space frame S away from the vehicle on the road, a downward switch for moving the parking space frame S toward the vehicle, a leftward switch for moving the parking space frame S in the leftward direction, a rightward switch for moving the parking space frame S in the rightward direction, a counterclockwise switch for rotating the parking space frame S in the counterclockwise direction, and a clockwise switch for rotating the parking space frame S in the clockwise direction. The parking space frame S can be moved in four directions and rotated with respect to a center thereof.

When the parallel parking mode switch is operated by touching on the screen of the touch display 16, the parking space frame S for showing the target parking position into which the vehicle should be parked on the road by the parallel parking and the arrow button switch C are both displayed on the screen as shown in FIG. 2B while the rearward image of the vehicle taken by the camera 14 is displayed on the screen.

In this case, the arrow button switch C includes the aforementioned upward switch, the downward switch, the leftward switch, and the rightward switch without the counterclockwise switch or the clockwise switch. In the parallel parking, the parking space frame S can be moved in four directions but not be rotated with respect to the center thereof. That is, the vehicle is only moved in a longitudinal direction and a transverse direction.

The parking space frame S has a rectangular shape substantially corresponding to a dimension of the vehicle. However, on the screen, the parking space frame S is in a shape in accordance with a position on the screen. In addition, each time the arrow button switch C is operated by the touch operation of the driver, the parking space frame S is moved by X cm (5 cm, for example) or rotated by Y° (1°, for example) on the actual road. In this case, the more the parking space frame S is close to the vehicle, the greater the moving amount of the parking space frame S is on the screen of the touch display 16 by the touch operation due to a perspective relation in the vehicle rearward image taken by the camera 14.

When the garage parking mode switch or the parallel parking mode switch is operated by touching, a confirmation button switch K for confirming a setting of the target parking position by the parking space frame S is displayed together with the parking space frame S and the arrow button switch C on the screen. When the confirmation button switch K is operated after the parking space frame S is moved to a required position, the setting of the target parking position is fixed and also the calculation of the traveling locus to that target parking position from the present vehicle position, which is defined as an initial position, is started.

Figure 3:
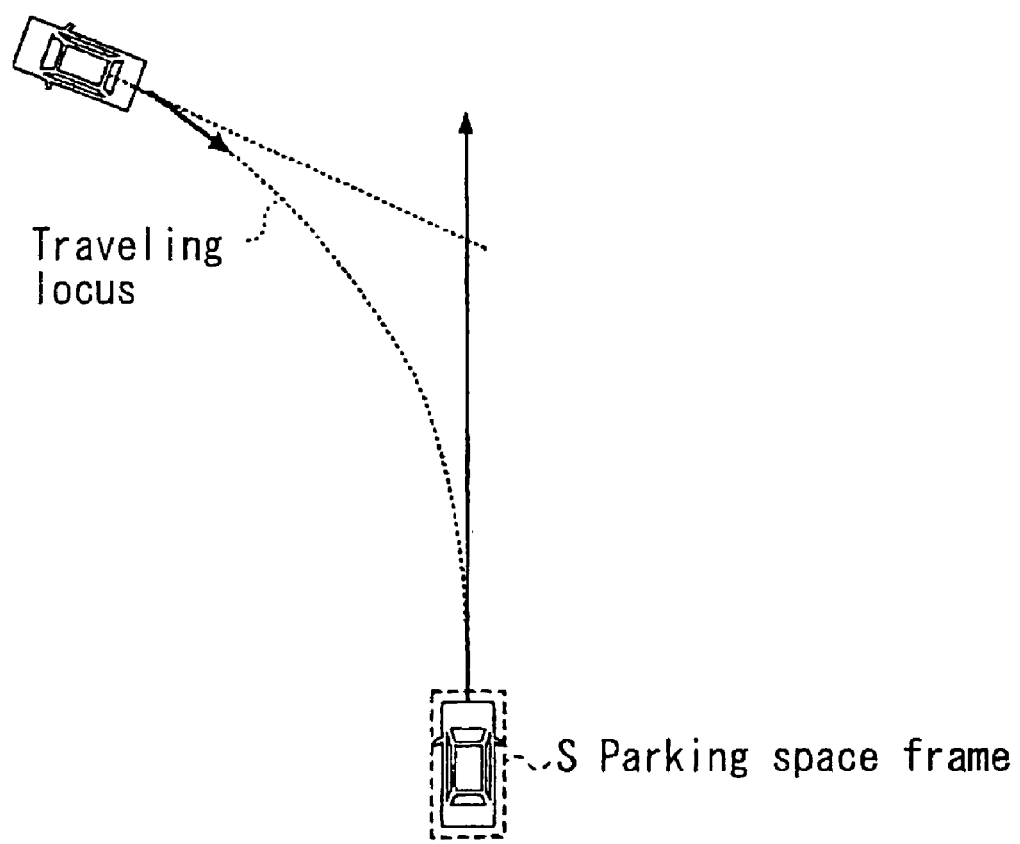
FIG. 3 is a view showing the traveling locus to the target parking position at the garage parking.

FIG. 3 is a view showing the traveling locus to the target parking position at the garage parking. In the garage parking mode, the traveling locus to the target parking position is calculated based on a relative position relation between the present vehicle position and the target parking position so that 1: straight reverse interval of a predetermined distance Z1, 2: steering angle maximizing interval, 3: fixed interval of the steering angle, 4: steering angle minimizing (i.e. returning) interval, and 5: straight reverse interval of a predetermined distance Z2 are appropriately formed as the traveling locus in case that a predetermined geometric position condition determined by a minimum turning radius of the vehicle and the relative position relation between the present vehicle position and the target parking position is satisfied.

Figure 4:
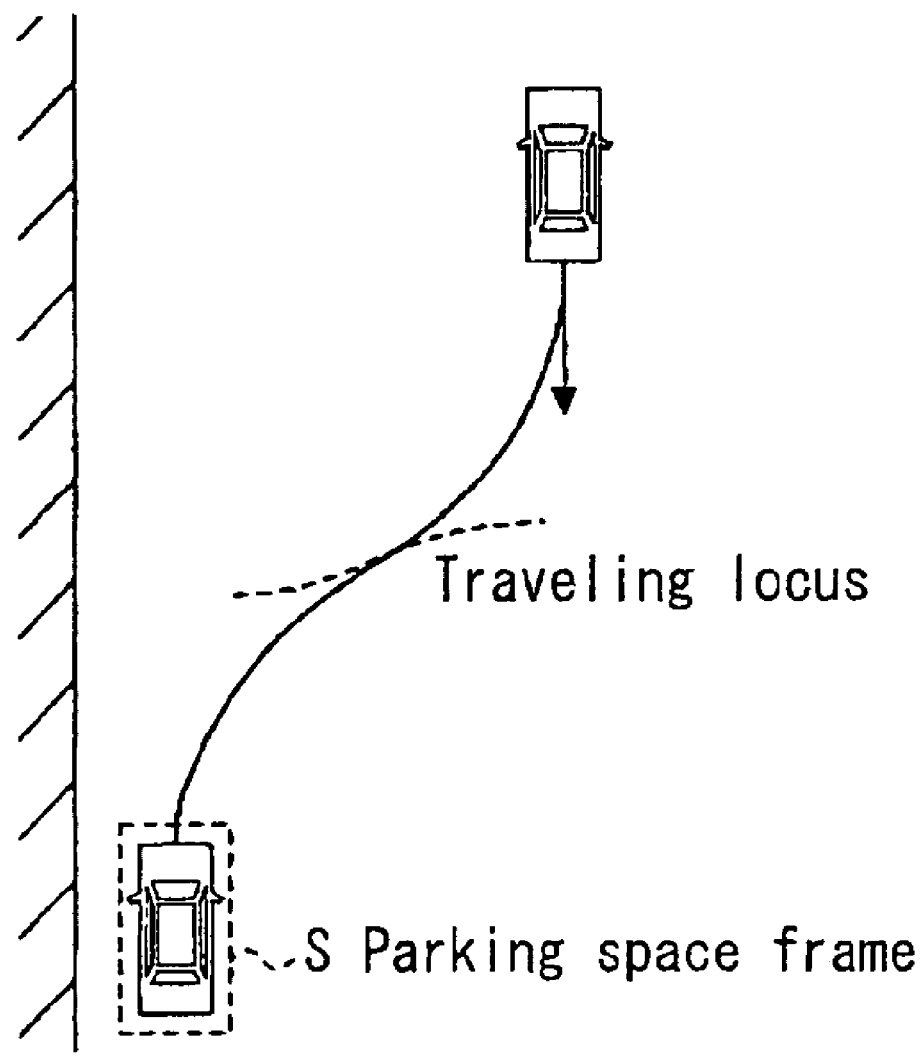
FIG. 4 is a view showing the traveling locus to the target parking position at the parallel parking.

FIG. 4 is a view showing the traveling locus to the target parking position at the parallel parking. In the parallel parking mode, the traveling locus to the target parking position is calculated based on the relative position relation between the present vehicle position and the target parking position so that two circles in contact with each other as the traveling locus are appropriately formed in case that the predetermined geometric position condition determined by the minimum turning radius of the vehicle and the relative position relation between the present vehicle position and the target parking position is satisfied.

When the traveling locus to the target parking position is calculated and generated in the garage parking mode or the parallel parking mode, the information of the traveling locus and the target parking position is stored in the memory 20. In this case, the arrow button switch C and the confirmation button switch K are not displayed on the screen of the touch display 16. Then, the inside of the parking space frame S becomes colored with green, for example, thereby showing that the parking assist control can be conducted. Whereas, when the traveling locus to the target parking position is not generated, the inside of the parking space frame S becomes colored with red, for example, thereby showing that the parking assist control can not be conducted. In this case, the arrow button switch C and the confirmation button switch K are kept displayed on the screen for urging the driver to change the target parking position.

When the vehicle starts reversing by a creep force and the like caused by the driver canceling the brake operation in a state in which the traveling locus to the target parking position is generated, the traveling amount of the vehicle is calculated subsequently. The vehicle position relative to the generated traveling locus is calculated based on the calculated traveling amount of the vehicle and the steering angle information from the EPS 18. In addition, the target steering angle for moving the vehicle along the generated traveling locus is calculated. The calculated target steering angle is supplied to the EPS 18. The EPS 18 generates the torque in the electric motor for rotating the steering shaft based on the target steering angle obtained from the parking assist ECU 12 so that the vehicle is guided along the generated traveling locus.

Further, when the vehicle starts reversing in a state in which the traveling locus to the target parking position is generated, the traveling amount of the vehicle is calculated subsequently and also a reset button switch is displayed on the screen of the touch display 16. The reset button switch is provided for changing the target parking position presently set to the other position. That is, resetting of the target parking position can be achieved by the reset button switch. The reset button switch is desirably effective only when the vehicle is in a stopped state.

When the reset button switch is not operated by touching, the parking assist control is performed in accordance with the information of the traveling locus and the target parking position stored in the memory 20 at that time. Whereas, when the reset button switch is operated by touching, the arrow button switch C, the parking space frame S with no color, and the confirmation button switch K are again displayed on the screen of the touch display 16 as shown in FIGS. 2A and 2B. Then, when the confirmation button switch K is operated again by touching after the parking space frame S is shifted to a required position, the resetting of the target parking position is fixed. The traveling locus to the target parking position from the present vehicle position at that time, which is defined as the initial position, is started to be calculated.

The calculation of the traveling locus to the target parking position at the resetting is performed based on the steering angle at the resetting and the relative position relation between the present vehicle position and the target parking position in case that the position condition for calculating the traveling locus at the resetting is different from that at the initial setting. Then, the procedure in response to whether the traveling locus is generated or not is performed, which is the same condition as in the initial setting. Each time the reset button switch is operated by touching, the same procedure is conducted afterwards.

According to the above structure of the parking assist apparatus 10, the parking assist control for automatically steering the vehicle along the traveling locus to the target parking position being set by the vehicle driver can be performed at the garage parking and the parallel parking. With the implementation of the parking assist control, the vehicle driver is not required to conduct the steering operation when parking the vehicle in the target parking position. Thus, a burden of the steering operation of the driver may be reduced during the garage parking and the parallel parking according to the parking assist apparatus 10 of the present embodiment.

Further, when the vehicle starts reversing with the traveling locus to the target parking position being generated, subsequently the traveling amount of the vehicle is calculated based on the movement thereof. At the same time, the present vehicle position relative to the target parking position is calculated. Then, a deviation amount of the detected present position from the generated traveling locus at the initial setting or the resetting stored in the memory 20 at the present moment, precisely the deviation amount of the detected present position from an actually desired position of the vehicle on the generated traveling locus obtained if the vehicle moved on the generated traveling locus with a distance corresponding to the traveling amount from the initial position to the present vehicle position, is calculated.

When the deviation amount is relatively small, it is determined that the vehicle moves substantially appropriately along the traveling locus and thus can reach the target parking position. Meanwhile, when the deviation amount is relatively large, the vehicle may not reach the target parking position by being automatically steered along the generated target locus. In this case, the traveling locus is required to be appropriately changed so that the vehicle can reach the target parking position. Then, when the deviation amount of the present position from a presently required position on the traveling locus reaches a first predetermined value L1 (5 cm, for example), the traveling locus from the present position to the target parking position being presently set is started to be calculated (i.e. new traveling locus).

The new traveling locus to the target parking position is calculated based on the steering angle at the calculation of the new traveling locus and the relative position relation between the present position and the target parking position in case that the position condition for calculating the new traveling locus is different from that at the initial setting, which is the same manner as the traveling locus calculation at the resetting. Then, the procedure in response to whether the traveling locus is generated or not is performed, which is the same condition as in the initial setting.

According to the above-mentioned structure of the parking assist apparatus 10, when the vehicle is deviated from the required traveling locus due to an existence of a small obstacle such as an inclination of the road and the stone, or the disturbance such as a change of wheel radius due to a change of the load mounted on the vehicle, the required traveling locus to the target parking position being set by the vehicle driver is automatically modified without the operation of the vehicle driver. Therefore, even if the vehicle is deviated from the required traveling locus, the vehicle can accurately reach the previously set target parking position by the automatic steeling, thereby appropriately performing the parking assist control.

Figure 5:
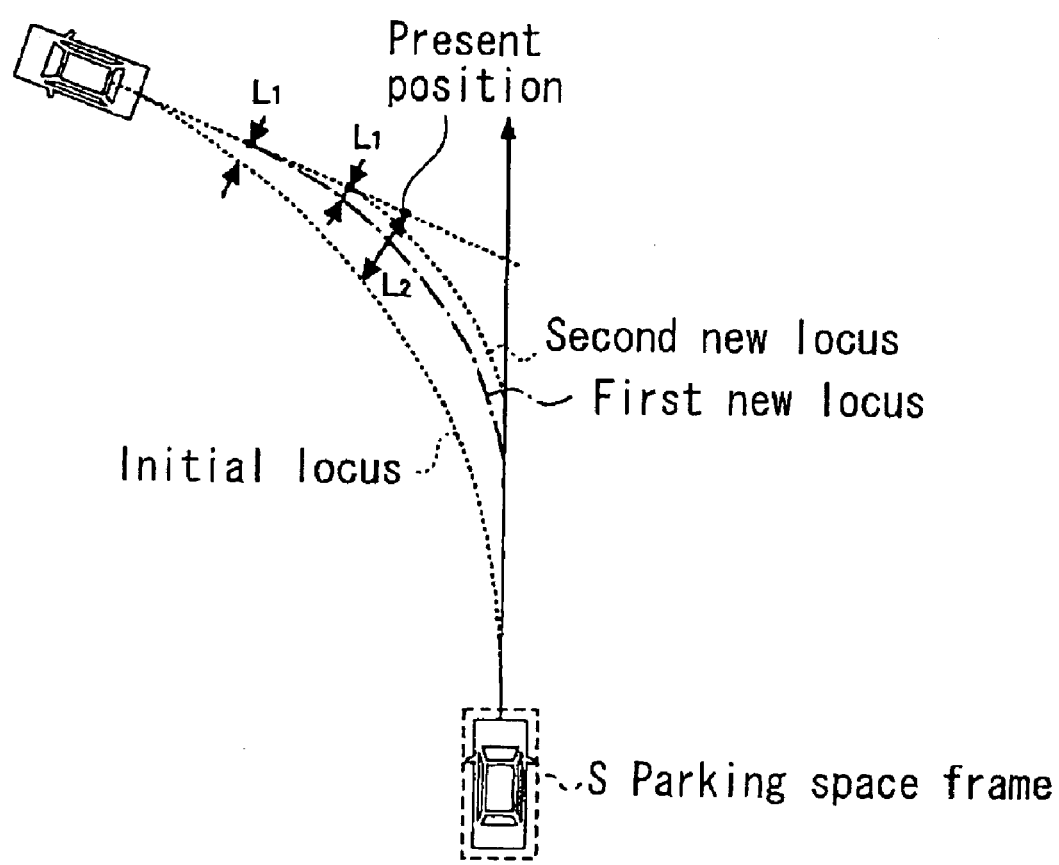
FIG. 5 is a view showing a state in which the traveling locus to the target parking position is changed in response to the movement of the vehicle at an occurrence of a system error according to the embodiment of the present invention.

FIG. 5 is a view showing a state in which the traveling locus to the target parking position is changed in accordance with the movement of the vehicle when a system error occurs. As mentioned above, when the deviation amount of the present vehicle position from the presently required position on the traveling locus reaches the first predetermined value L1, the new traveling locus to the target parking position is calculated. If the system error such as the malfunction of the EPS 18 and an inappropriate operation of the electric motor due to a wheel falling into a ditch exists in the vehicle, the vehicle cannot be guided to the target parking position along the traveling locus due to the system error. That is, the vehicle cannot be parked in the target parking position.

According to the structure of the present embodiment, the calculation of the new traveling locus to the target parking position may be performed repeatedly when the system error by which the EPS 18 does not operate appropriately is caused. If the calculation of the new traveling locus is repeated, the parking assist control keeps steering the vehicle along the new traveling locus generated by the calculation, thereby causing the unexpected movement of the vehicle. In order to avoid such a problem, it is appropriate to prevent the new traveling locus to the target parking position set by the driver from being repeatedly calculated and to immediately stop the parking assist control.

The more the calculation of the new traveling locus to the target parking position is repeated, the more the deviation amount of the thus calculated and generated traveling locus is from the initial traveling locus generated when the target parking position is set by the vehicle driver. The present vehicle position is largely deviated from the initial traveling locus. Therefore, if the calculated deviation amount of the present vehicle position from the initial traveling locus becomes greater than a second predetermined value L2 (50 cm, for example), which is several times greater than the aforementioned first predetermined value L1, the parking assist control is brought to be stopped as being defined that the calculation of the new traveling locus to the target parking position is repeatedly conducted and thus the system error is caused. As a result, the parking assist control can be immediately stopped.

The parking assist apparatus 10 according to the present embodiment can immediately stop the parking assist control at the occurrence of the system error. The feature of the present embodiment is explained referring to FIG. 6.

Figure 6:
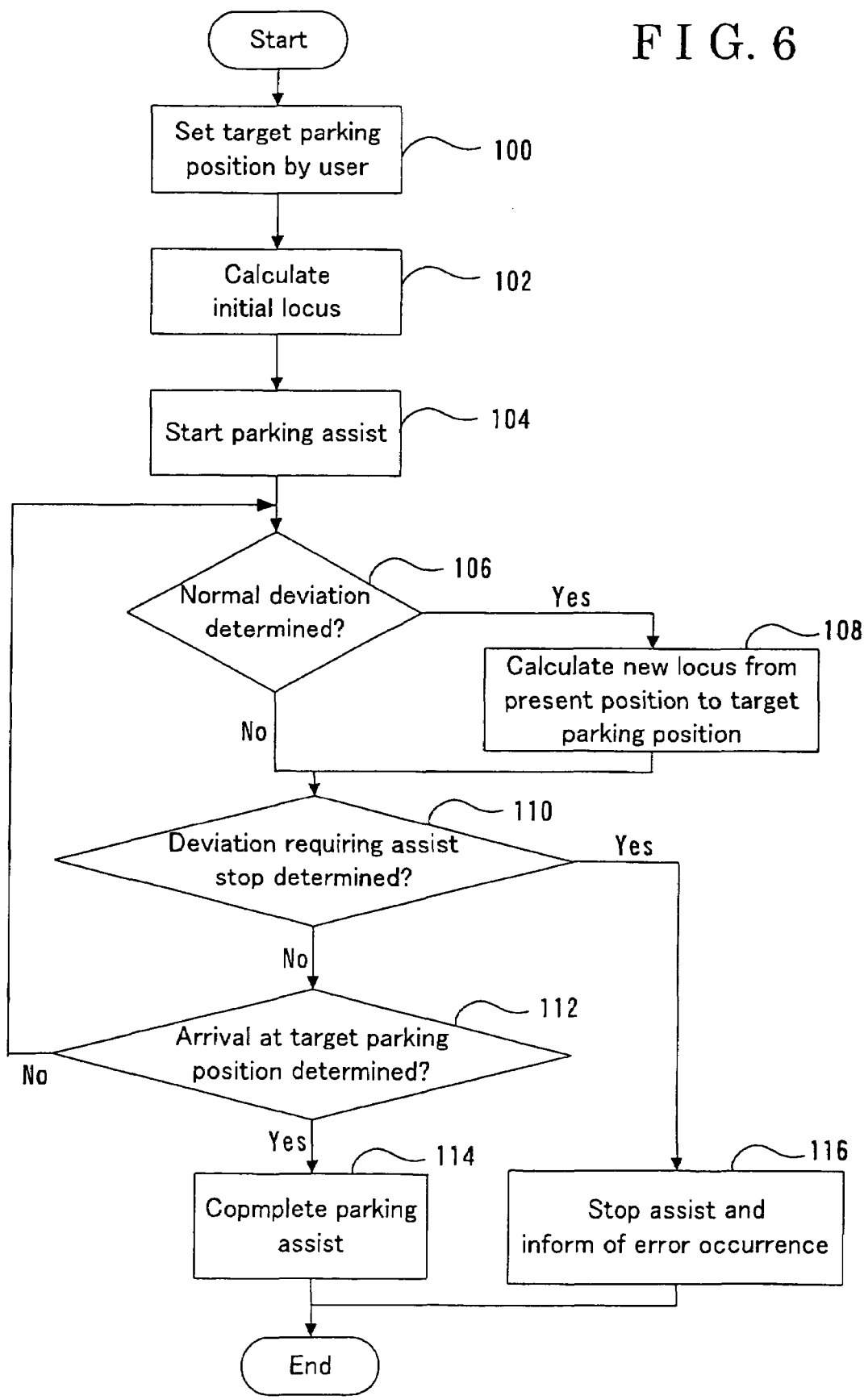
FIG. 6 is a flowchart of a control routine performed in the parking assist apparatus according to the embodiment of the present invention.

FIG. 6 is a flowchart of an example of a control routine conducted by the parking assist ECU 12 in the garage parking mode and the parallel parking mode according to the present embodiment. The routine of FIG. 6 is repeatedly implemented each time the garage parking mode or the parallel parking mode is activated. When the routine of FIG. 6 is implemented, a process in Step 100 is first conducted.

In Step 100, the parking space frame S is moved by a touch operation on the arrow button switch C on the screen of the touch display 16 implemented by the vehicle driver, thereby performing the setting of the target parking position in which the vehicle is desired to be parked. The setting of the target parking position includes the resetting thereof by the touch operation on the reset button switch by the vehicle driver performed after the vehicle starts to move along the initially generated traveling locus by the parking assist control.

In Step 102, the target parking position is first fixed via the confirmation button switch K being operated by touching on the screen of the touch display 16. Next, the traveling locus from the present position defined as the initial position to the target parking position is calculated. In this case, the traveling locus generated by this calculation is the initial traveling locus initially calculated after the target parking position is set. Then, the information of the target parking position and the initial traveling locus is stored in the memory 20, which is maintained until the parking assist control is completed or stopped. When the traveling locus is generated in Step 102, the process is proceeded to Step 104. Meanwhile, when the traveling locus is not generated in Step 102, the process for urging the driver to change the above target parking position is performed.

In Step 104, the parking assist control is started to automatically steer the vehicle by instructing the EPS 18 in accordance with the movement of the vehicle so that the vehicle moves along the traveling locus generated by the calculation in Step 102.

In Step 106, it is determined whether or not a normal deviation of the vehicle is caused at the present time. That is, it is determined whether or not the deviation amount of the vehicle from the latest traveling locus (initial traveling locus or a new traveling locus) presently set and on which the vehicle should be positioned, i.e., precisely the deviation amount of the present vehicle position from an actually desired position on the latest traveling locus obtained if the vehicle moved on the latest traveling locus with a distance corresponding to the traveling amount from the initial position to the present vehicle position, is equal to or greater than the first predetermined value L1.

The first predetermined value L1 is a minimum distance between the present vehicle position and the traveling locus obtained at that time by which calculation of the new traveling locus to the target parking position is required. When it is determined that the normal deviation is caused according to the result in Step 106, the process is proceeded to Step 108. Meanwhile, when it is determined that the normal deviation is not caused, Step 108 is skipped and the process is proceeded to Step 110.

In Step 108, the new traveling locus from the present vehicle position to the target parking position being set in Step 100 is calculated. After the process in Step 108, the parking assist control is performed by using the newly generated traveling locus along which the vehicle is guided instead of the previous traveling locus. After completion of Step 108, the process is proceeded to Step 110.

In Step 110, it is determined whether or not a deviation by which the parking assist control is required to stop occurs in the vehicle. That is, it is determined whether or not the deviation amount of the vehicle from the initial traveling locus first generated after the target parking position is set or reset, precisely the deviation amount of the present vehicle position from an actually desired position on the initial traveling locus obtained if the vehicle moved on the initial traveling locus with a distance corresponding to the traveling amount from the initial position to the present vehicle position, is equal to or greater than the second predetermined value L2.

The second predetermined value L2 is a minimum distance between the present vehicle position and the initial traveling locus by which the parking assist control should be stopped and is defined as several times greater than the above-mentioned first predetermined value L1. When it is determined that the deviation is not caused in Step 110, the process is proceeded to Step 112. Meanwhile, when it is determined that the deviation is caused, the process is proceeded to Step 116.

In Step 112, it is determined whether or not the vehicle reaches the target parking position or the vicinity of the target parking position. When it is determined that the vehicle does not reach the target parking position or the vicinity of the target parking position yet, the process after Step 106 is repeated. When it is determined that the vehicle reaches the target parking position or the vicinity of the target parking position, the process is proceeded to Step 114. In Step 114, the parking assist control for guiding the vehicle to the target parking position by the automatic steering operation is finished. Then the information stored in the memory 20 is deleted. After completion of Step 114, the present routine is terminated.

Whereas, in Step 116, the parking assist control is stopped and at the same time the driver is informed visually through the screen of the touch display 16 or audibly through a speaker that the system error is caused and therefore the parking assist control is stopped. Subsequently, the traveling locus to the target parking position set in Step 100 is not calculated and also the vehicle is not automatically steered. The vehicle driver is informed of the stop of the parking assist control due to the system error. After the completion of Step 116, the present routine is terminated.

According to the routine shown in FIG. 6, when the present vehicle position is deviated from the actually desired position on the initial locus by the second predetermined value L2 or more and thus the parking assist control is required to stop after the parking assist control is started in the garage parking or the parallel parking mode, the parking assist control can be stopped. When the present vehicle position is widely deviated from the initial locus, it is determined that the new locus to the target parking position is generated multiple times. Then, it is determined that the parking assist control is not appropriately performed due to the system error such as the vehicle falling into the ditch. In this case, the parking assist control itself is not required since the vehicle cannot reach the target parking position even if the parking assist control is continued.

Therefore, according to the parking assist apparatus 10 of the present embodiment, the parking assist control can be immediately stopped at the occurrence of the system error, thereby avoiding the unexpected behavior of the vehicle due to the continuation of the parking assist control.

According to the aforementioned present embodiment, when the parking assist control is stopped due to the deviation of the present vehicle position from the initial locus, the traveling locus to the target parking position is prohibited to be calculated subsequently regardless of the vehicle position and thus the traveling locus is not generated. The new locus to the target parking position is not required to be calculated when the parking assist control is not performed and the vehicle is not automatically steered along the traveling locus. Thus, the new traveling locus to the target parking position is prevented from being unnecessarily calculated according to the present embodiment.

In addition, according to the present embodiment, when the parking assist control is stopped due to the deviation of the present vehicle position from the initial traveling locus, at the same time the driver is visually and audibly informed of the occurrence of the system error and the stop of the parking assist control due to the system error. In this case, the driver can be notified that the parking assist control is stopped due to the system error. Therefore, it can be avoided that the parking assist control is stopped by the system error without notification to the vehicle driver.

According to the present embodiment, only the automatic steering by the electric motor of the EPS 18 is performed as the parking assist control for guiding the vehicle to the target parking position along the traveling locus. However, the present embodiment is not limited to this and the driving and controlling of the vehicle may be also automatically performed without the operation of the vehicle driver. Further, the operation of the vehicle driver may be assisted by indicating the reference line on the screen of the touch display 16 or an audio guidance.

Further, according to the present embodiment, the determination of whether or not the present vehicle position is deviated and thus the parking assist control is required to stop is based on whether or not the deviation amount of the present vehicle position from the initial traveling locus reaches the second predetermined value L2. However, instead, the determination whether or not the parking assist control is required to stop may be based on whether or not a number of the traveling locus to the target parking position being generated by calculation, which is obtained by counting after the initial traveling locus is first generated by the driver setting or resetting the target vehicle position, reaches a predetermined counted value.

In the aforementioned structure, the parking assist ECU 12 determines whether or not the deviation of the present vehicle position by which the parking assist control is required to stop is caused based on the number of the generated traveling locus to the target parking position being counted after the initial traveling locus is generated. When the calculation and generation of the traveling locus to the target parking position are repeatedly performed, it is determined that the parking assist control is not appropriately performed due to the system error and thus the vehicle cannot be guided along the traveling locus. Therefore, the parking assist control can be immediately stopped according to this structure in the same way as the aforementioned embodiment and prevent the unexpected operation of the vehicle due to the continuation of the parking assist control.

The principles, preferred embodiment and mode of operation of the present invention have been described in the foregoing specification. However, the invention which is intended to be protected is not to be construed as limited to the particular embodiment disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What we claim is:

1. A parking assist apparatus comprising:
    an initial traveling locus calculating means for calculating an initial traveling locus from an initial position of a vehicle to a target parking position in which the vehicle is desired to be parked;
    a new traveling locus calculating means for calculating a new traveling locus from a present vehicle position to the target parking position when a deviation amount of the present vehicle position from an initial traveling locus is equal to or greater than a first predetermined value;
    a parking assist means for performing a parking assist to guide the vehicle along the traveling locus generated by one of a calculation of the initial traveling locus calculating means and a calculation of the new traveling locus calculating means; and
    an initial traveling locus deviation calculating means for calculating the deviation amount of the present vehicle position from the initial traveling locus generated by the calculation of the initial traveling locus calculating means; wherein the parking assist means stops performing the parking assist when the deviation amount calculated by the initial traveling locus deviation calculating means is equal to or greater than a second predetermined value which is greater than the first predetermined value.

2. A parking assist apparatus according to claim 1, wherein the new traveling locus calculating means stops calculating the new traveling locus to the target parking position when the deviation amount calculated by the initial traveling locus deviation calculating means is equal to or greater than the second predetermined value.

3. A parking assist apparatus according to claim 2, wherein the initial traveling locus deviation calculating means calculates the deviation amount of the present vehicle position from a desired position of the vehicle on the initial traveling locus generated by the calculation of the initial traveling locus calculating means, which is obtained in case of the vehicle moving on the initial traveling locus with a distance corresponding to a traveling distance of the vehicle from the initial position to the present position.

4. A parking assist apparatus according to claim 3, further comprising an error informing means for informing a vehicle driver of a system error when the deviation amount calculated by the initial traveling locus deviation calculating means is equal to or greater than the second predetermined value.

5. A parking assist apparatus according to claim 1, wherein the first predetermined value is a minimum distance between the present vehicle position and the traveling locus.

6. A parking assist apparatus according to claim 1, wherein the second predetermined value is a minimum distance between the present vehicle position and the initial traveling locus.

7. A parking assist apparatus comprising:
    an initial traveling locus calculating means for calculating an initial traveling locus from an initial position of a vehicle to a target parking position in which the vehicle is desired to be parked;
    a new traveling locus calculating means for calculating a new traveling locus from a present vehicle position to the target parking position when a deviation amount of the present vehicle position from a current traveling locus is equal to or greater than a first predetermined value;
    a parking assist means for performing a parking assist to guide the vehicle along the traveling locus generated by a calculation of the initial traveling locus calculating means or a calculation of the new traveling locus calculating means; and
    a number counting means for counting a number of the new traveling locus to be generated by the calculation of the new traveling locus calculating means after the initial traveling locus is generated by the calculation of the initial traveling locus calculating means; wherein the parking assist means stops performing the parking assist when the number of the new traveling locus to be generated, which is counted by the number counting means, is equal to or greater than a predetermined number.

8. A parking assist apparatus according to claim 7, further comprising an error informing means for informing a vehicle driver of a system error when the number counted by the number counting means is equal to or greater than the predetermined number.

* * * * *